United States Patent [19]
Preis et al.

[11] Patent Number: 4,585,811
[45] Date of Patent: Apr. 29, 1986

[54] REINFORCING AGENTS FOR ELASTOMERS, THE PRODUCTION OF REINFORCED ELASTOMERS AND REINFORCED ELASTOMERS

[75] Inventors: Lothar Preis, Bergisch-Gladbach; Rudolf Schmidt, Burscheid; Josef Esser, Leverkusen; Hans Magg, Bergisch-Gladbach, all of Fed. Rep. of Germany

[73] Assignee: Bayer Aktiengesellschaft, Leverkusen-Bayerwerk, Fed. Rep. of Germany

[21] Appl. No.: 636,295

[22] Filed: Jul. 31, 1984

[30] Foreign Application Priority Data

Aug. 11, 1983 [DE] Fed. Rep. of Germany ....... 3329127

[51] Int. Cl.$^4$ .......................... C08L 7/00; C08L 9/00; C08K 7/02; C08K 7/04
[52] U.S. Cl. .................................. 523/206; 523/209; 523/438; 523/527; 525/108; 525/125; 525/133; 525/166; 525/184
[58] Field of Search ................ 524/494; 523/527, 206, 523/438, 209; 525/108, 125, 133, 166, 184

[56] References Cited

U.S. PATENT DOCUMENTS

| | | | |
|---|---|---|---|
| 3,553,157 | 1/1971 | Dijkstra et al. | 524/494 |
| 3,721,643 | 3/1973 | Vargiu et al. | 523/527 |
| 3,746,669 | 7/1973 | Dunnom et al. | 524/494 |
| 3,787,352 | 1/1974 | Marzocchi et al. | 524/494 |
| 3,834,934 | 9/1974 | Broisman | 523/206 |
| 3,896,253 | 7/1975 | Elmer | 524/494 |
| 4,439,556 | 3/1984 | Girgis | 523/206 |

*Primary Examiner*—Allan M. Lieberman
*Attorney, Agent, or Firm*—Connolly and Hutz

[57] ABSTRACT

Elastomers reinforced with fibrous composite materials and having improved properties are obtained if the strengthening means used are composite materials based on reinforcing fibres and reactive resins which are coated with adhesion promoters based on polyisocyanates.

7 Claims, No Drawings

REINFORCING AGENTS FOR ELASTOMERS, THE PRODUCTION OF REINFORCED ELASTOMERS AND REINFORCED ELASTOMERS

Elastomers having reinforcing inserts of low extensibility and high tenacity are used in many varied forms. The, in most cases, fibrous or woven elements are intended to guarantee the dimensional stability of the elastomers when they are exposed to deforming forces.

The type of reinforcing element depends on the stress expected to occur. This strengthening means consisting of textile fibres, for example cellulose derivatives, polyamides, polyesters or polyvinyl alcohol, or of glass fibres are preferred for articles subjected to dynamic stress, owing to their flexibility. In the case of static stress, on the other hand, lower flexibility can be advantageous. In such cases steel ropes plated with brass or zinc are for example used.

Strengthening means which are of particular interest for elastomers are fibre-reinforced composite materials, preferably having a unidirectional fibre-orientation, owing to their high tensile strength, their good resistance to corrosion and their low weight.

The customary fibrous composite materials based on glass or carbon fibres and reactive resins, such as UP or EP resins (unsaturated polyester resins, epoxy resins) are not, however, suitable for this purpose because their adhesion to the elastomer matrix is so low that the reinforcing properties can only be utilised to a low extent.

Neither are the known adhesion promoters, mainly compounds of resorcinol and formaldehyde, for example resorcinol itself, metal compounds or reaction products of weak organic bases and formaldehyde, effective in the case of the fibrous composite materials mentioned.

Thus the aim of the present invention is to overcome the existing difficulties and to provide fibrous composite materials which are suitable as reinforcing materials for elastomers. This aim is achieved according to the invention by using as the strengthening means composite materials, based on reinforcing fibres and reactive resins, which are coated with adhesion promoters based on polyisocyanates.

Preferably, incompletely cured composite materials, termed prepregs in the following, are used as the strengthening means.

According to DIN No. 61 850 prepregs are moulding compositions consisting of sheet-form or line-shaped reinforcing materials which are preimpregnated with curable resin compositions. In the context of the present invention prepregs are not restricted to glass fibres; glass fibres are however preferred.

The composite materials are produced by impregnating strands of reinforcing fibres, consisting, for example, of glass fibres, with a liquid reactive resin which preferably contains all of the additives, such as hardeners, cross-linking agents, accelerators, fillers, stabilisers, flameproofing agents and solvents, which are necessary to obtain the required end properties. In the next step the individual strands are collected together, any solvent present is first removed, for example by drying in a hot-air channel, and the bundle of fibres is coated with an adhesion-promoting system. The application of the adhesion-promoting system can be carried out either directly following the impregnation with the reactive resin, in the same working step, or separately. Preferably synthetic fibres consisting, for example of polyamide, polyester, cellulose derivatives or polyacrylonitrile, are wound radially around the fibre strands before they are coated with the adhesion promoting system. After the adhesion-promoting system has been applied the intermediate product is prepolymerised or precondensed at an elevated temperature.

The strengthening means according to the invention is finally embedded in a mixture consisting of cross-linkable rubber based, for example, on natural rubber, polychloroprene, polyisoprene, styrene-butadiene rubber or chlorinated polyethylene, which contains all the additives, such as fillers, processing agents, anti-ageing agents or cross-linking agents which are necessary for the obtainment of particular elastomer properties. The rubber is then vulcanised.

The vulcanisation temperature is selected according to practical conditions, and is for example 120°–220° C., preferably 140°–180° C. In the vulcanisation step, which can be carried out under an excess pressure or under normal pressure an intimate bond is produced between the strengthening means and the rubber matrix. The prepregs are cured under the conditions of vulcanisation.

In addition to glass fibres polyester, polyamide, aramide, rayon, polyvinyl alcohol, carbon and metal fibres, are suitable for use in the strengthening means. The fibres can be used in the form of fibre strands, such as yarns, filament yarns, twists, rovings and as-spun filaments or textile sheet-fabrics. Preferably the strengthening means have unidirectional fibre orientation. Glass fibres are preferred.

The fibres are, in particular, continuous (filaments). The thicknesses of the fibres can vary within wide limits. Preferably the fibres have diameters between 5 and 25 $\mu$m, in particular when they are glass fibres.

Suitable reactive resins are for example unsaturated polyester resins, epoxy resins, phenolic resins, polyurethane resins, polyimide resins and cyanate resins. Unsaturated polyester resins and epoxy resins are preferred.

The adhesion-promoting system contains a rubber, for example, natural rubber, polyisoprene, styrenebutadiene rubber, polychloroprene or nitrile rubber, and a polyisocyanate as the cross-linking agent, such as hexamethylene diisocyanate, diphenylmethane diisocyanate, or polymethylene/polyphenylene isocyanates which are derived from 4,4'-diphenylmethane diisocyanate, triphenylmethane triisocyanate and thionophosphoric acid tris-p-isocyanatophenyl ester. Diphenylmethane diisocyanate, triphenylmethane triisocyanate and thionophosphoric acid tris-p-isocyanatophenyl ester are preferred. The rubber can contain customary additives, such as fillers, metal oxides, plasticizers, anti-ageing agents, sulphur or accelerators. The adhesion-promoting system can contain further additives such as epoxides, for example, glycerol glycidyl ether or bisphenol A diglycidyl ether. The epoxide content is 5–300% of the rubber content. The epoxide is used in the form of a solution.

The ratio by weight of rubber:isocyanate is 1:0.2 to 1:3, preferably 1:0.5 to 1:2.

The ratio by weight of elastomer:reinforcing element is between 0.3 and 0.01, preferably between 0.15 and 0.05.

The adhesion-promoter solution is applied by immersion of the strengthening means, by brush application or by spraying, it being possible to repeat this step several times. The adhesion promoter solution is obtained by mixing a solution of the rubber in suitable solvents, such as aliphatic or aromatic hydrocarbons, preferably benzine, benzene, toluene, ethyl acetate, methylethyl ketone, methylene chloride or perchloroethylene, with a solution of the isocyanate in like solvents in such a way that the required weight ratios result. For the production of the rubber solution the rubber mixture which has been plasticised on a roll mill or closed mixer and optionally provided with further additives, is transferred to a solution masticator in which it is dissolved in the solvent. The concentration of the rubber in the solution should be 1–25% by weight, preferably 5–15% by weight.

Possible fields of application for the elastomers reinforced according to the invention are flexible bearings for girders supporting prefabricated bridge sections and precast reinforced concrete sections, above all in areas threatened by earthquakes and in regions subject to mining subsidence, shock and vibration absorbers in the machine and motor vehicle sectors, reinforcing elements in the form of belts for large-volume rubber containers, for example for the transportation of liquids in the sea, hose lines, conveyor belts and the belts with unsupported flanks. By means of the reinforcements the flexible properties of the element are able to be regulated according to the stress profile.

EXAMPLE 1

6 Roving strands consisting of E-glass and each having a titre of 2,400 tex were introduced into an impregnating bath, saturated with an unsaturated polyester resin, based on ethoxylated phenol and maleic anhydride in the form of a 60% strength by weight solution in styrene, and having an acid number of at most 15, and a viscosity at 20° C. of 3,000 mPa.s, and taken together. 1.5% by weight, based on the strengthening means, of stretched polyester fibres (total titre 140 dtex) were wound around the impregnated bundle of fibres in opposite directions and curing was then carried out in a subsequent curing section (forced-air oven) at 130°–140° C.

The strengthening means thus produced had a circular cross-section (diameter 3.2 mm) and a tensile strength of 1,466 N/mm$^2$. The proportion of glass fibres was 81.6% by weight. The surface of the strengthening means was coated with the adhesion promoting solution by means of a coating nozzle, according to method A and was dried at 80° C. until the adhesion-promoter film no longer exhibited any tackiness.

The total coating of adhesion promoter was 0.8% by weight, based on the weight of the strengthening means.

EXAMPLE 2

According to example 1 cylindrical structures having a diameter of 6 mm, a breaking strength of 37.6 kN and a glass fibre content of 79.7% by weight were produced from 18 roving strands of E-glass according to example 1 and an unsaturated polyester resin based on isophthalic acid/maleic anhydride and diethylene glycol/monopropylene glycol in the form of 60% strength by weight solution in styrene, and having an acid number of at most 25 and a viscosity of 1,000 to 1,300 mPa.s. These structures were coated with an adhesion-promoting solution according to method B. The coating of adhesion promoter amounted to 1.2% by weight.

EXAMPLE 3

An E-glass roving of 1,200 tex was impregnated with an unsaturated polyester resin based on isophthalic acid and styrene as the cross-linking agent and polyester fibres were wound around the impregnated roving according to example 1. Then the surface of the impregnated fibre strand was coated with an adhesion promoter solution according to method B.

The impregnated and coated fibre strand was dried at 80° C. and precondensed. A prepreg element having a glass content of 80.2% by weight, a nominal diameter of 0.9 mm and a breaking strength of 1,065N was obtained.

The adhesion promoter solutions are prepared by method A or B described in the following.

Method A 100 g of polychloroprene were mixed with 7 g of magnesium oxide and fed into a laboratory roll mill until a sheet was formed. Then the mixture was dissolved in 1,763 g of perchloroethylene in a laboratory solution masticator and finally 100 g of diglycidyl ether, dissolved in 100 g of perchloroethylene, were added. From this basic solution the adhesion promoter solution was mixed according to the following recipe:

| | |
|---|---|
| basic solution (10% solids content) | 100 g |
| triphenylmethane triisocyanate, 20% strength in methylene chloride | 100 g |
| perchloroethylene | 40 g. |

Method B 100 g of polychloroprene were premixed with 7 g of magnesium oxide until a sheet was formed which was dissolved in a laboratory solution masticator with a fourfold excess of a solvent mixture of benzine and toluene in a ratio of 1:1. The adhesion promoter solution was prepared from 100 g of this basic solution and 100 g of triphenylmethane triisocyanate (20% strength in methylene chloride).

The surface of the reinforcing elements was coated with the adhesion promoter solution A or B during or after the production of these elements by coating reinforcing fibre strands, impregnated with the reaction resin, before the pre-polymerisation stage or precondensation stage or after curing, for example with the aid of coating nozzles or rollers, by spraying, immersion or by application with a brush. Then drying is carried out at about 80° C. until the adhesion promoter film no longer exhibits any tackiness. Drying can also be carried out at room temperature until no more tackiness is present and thus the adhesion-promoting layer is free from solvent residues. If necessary this process can be repeated in order to obtain thicker adhesion promoter layers.

In testing the adhesion between the reinforcing element prepared by one of the above processes and the vulcanised rubber mixtures of varied composition were used.

| Recipe I | |
|---|---|
| polychloroprene | 100 g |
| stearic acid | 1 g |
| styrenated diphenylamine | 2 g |
| antiozonants | 2 g |
| antiozonant wax | 0.8 g |
| precipated active silicic acid | 35 g |
| diethylene glycol | 20 g |
| carbon black N-800 | 10 g |
| mineral oil plasticiser | 10 g |
| red lead | 20 g |
| ethylene thiourea | 0.8 g |
| mercaptobenzthiazole disulphide | 0.4 g |

-continued

| | | |
|---|---|---|
| | resorcinol diacetate | 4 g |
| | hexamethylomelamine pentamethyl ether | 2.3 g |
| Recipe II | | |
| | polychloroprene | 100 g |
| | magnesium oxide | 4 g |
| | stearic acid | 1.5 g |
| | styrenated diphenylamine | 1.5 g |
| | N—phenyl-N'—1,3-dimethylpentyl-p-phenylene diamine | 1 g |
| | antiozonant wax | 1 g |
| | carbon black N-330 | 58 g |
| | mineral oil plasticiser | 10 g |
| | diphenylcresyl phosphate | 10 g |
| | zinc oxide | 5 g |
| | ethylene thiourea | 0.6 g |
| | mercaptobenzthiazole disulphide | 0.5 g |
| | sulphur paste (75% strength in water) | 1 g |
| Recipe III | | |
| | styrene/butadiene rubber | 90 g |
| | polybutadiene | 10 g |
| | stearic acid | 1 g |
| | phenyl-$\beta$-naphthylamine | 1 g |
| | precipitated, active silicic acid | 25 g |
| | carbon black N-330 | 30 g |
| | xylene/formaldehyde resin | 10 g |
| | zinc oxide | 6 g |
| | sulphur paste (75% strength in water) | 5.3 g |
| | N,N—dicyclohexyl-thiobenzthiazole | 0.7 g |
| | mixture of resorcinol and methylol-melamine-pentamethyl ether 1:1 | 6 g |
| Recipe IV | | |
| | polychloroprene | 100 g |
| | polybutadiene | 10 g |
| | stearic acid | 1 g |
| | magnesium oxide | 4 g |
| | styrenated diphenylamine | 3 g |
| | precipitated active silicic acid | 25 g |
| | carbon black N-330 | 25 g |
| | light, inactive filler | 20 g |
| | hydrous aluminum oxide | 5 g |
| | chlorinated paraffin | 15 g |
| | mineral oil plasticiser | 5 g |
| | zinc oxide | 5 g |
| | sulphur | 1 g |
| | lead oxide | 2 g |

The mixtures were prepared in the customary manner in a laboratory roll mill or a laboratory closed mixer. The vulcanisation together with the reinforcing elements to form a composite element was carried out under excess pressure in suitable vulcanisation moulds. The vulcanisation conditions can be seen from the table.

After release from the moulds the adhesion of the cooled composite element was determined. For this two methods can be used (a) For testing according to the T-test method [cf. Bayer Mitteilungen fur die Gummi-Industrie (Rubber Industry Bulletin) no. 29, December 1961] test specimens of the dimensions 20×15×6 mm were prepared. With the aid of a commercially customary tensile testing machine the composite elements are separated at 80° C. and the maximum separating force necessary for the separation was measured. The test rate was 100 mm/min.

The mean value for at least 12 individual measurements is used for the evaluation. In addition an assessment is made for the extent to which the reinforcing element is covered with rubber following the separation (extent of covering).

(b) The second test method corresponds to the test specification DIN (German Industrial Standard) 22,131, sheet 3. The test length is 100 mm. The specific tearing force is calculated as the quotient of the tearing force measured and the test length. The covering of the strengthening means is assessed. If appropriate adhesion is not determined until the mixture has previously aged in the mould (22 min/145° C.).

The results are summarised in the following table. They show that methods 1 and 2, according to the invention, using various test recipes and strengthening means of differing diameters lead to degrees of adhesion which are as a rule better than the tear resistance of the vulcanised rubber.

In the table GFK means "glass-fibre-reinforced plastic".

Cured and non-cured GFK ropes do not exhibit any adhesion without the pretreatment according to the invention. After vulcanisation of the corresponding test specimens the separation of the rope and the rubber can, as a rule, be carried out without the aid of a machine. After separation the rope is free of rubber residues.

TABLE

| process acc. to | test recipe | strengthening means used (diameter) | impregnating method | vulcanisation conditions | test method | separating force | extent of covering |
|---|---|---|---|---|---|---|---|
| 1 | I | cured GFK-structure ($\phi$ 3.2 mm) | method A | 150° C./20 min | T-test | 360 N/20 mm | structural break in rubber |
| 1 | II | cured GFK-structure ($\phi$ 6 mm) | method B | 150° C./30 min | DIN 22131 | 105 N/mm | structural break in rubber |
| 1 | II | cured GFK-structure ($\phi$ 6 mm) | method B | 150° C./30 min + ageing 145° C./225 min | DIN 22131 | 100 N/mm | structural break in rubber |
| 1 | III | cured GFK-structure ($\phi$ 6 mm) | method B | 160° C./40 min | DIN 22131 | 90 N/mm | in some cases structural break |
| 2 | IV | prepreg ($\phi$ 0.9 mm) | method B | 150° C./30 min | T-test | 270 N/20 mm | in some cases structural break |

We claim:

1. Reinforcing elements comprising a reinforcing fiber impregnated with a reactive resin and coated with an adhesion promoting system wherein
    said reinforcing fiber is a fiber comprising glass, polyester, polyamide, aramide, rayon, polyvinyl alcohol, carbon or metal;
    said reactive resin is an unsaturated polyester resin, an epoxy resin, phenolic resin, a polyurethane resin, a polyimide resins or a cyanate resin; and said adhesion promoting system containing (i) a rubber which is natural rubber, polyisoprene, styrene butadiene rubber, polychloroprene or nitrile rubber, and (ii) a polyisocyanate wherein the weight ratio of rubber:isocyanate is from 1:0.2 to 1:3.

2. Reinforcing elements according to claim 1 wherein the reactive resin impregnating said reinforcing fiber is partially but incompletely cured.

3. Reinforcing elements according to claim 1 wherein the fibers are glass fibers.

4. Reinforcing elements according to claim 1 characterized in that the resin is unsaturated polyester resins.

5. Process for the production of reinforced elastomers, comprising vulcanizing an intimate mixture of reinforcing elements according to claim 1 and an elastomer which is natural rubber, polychloroprene, polyisoprene, styrene-butadiene rubber, or chlorinated polyethylene.

6. The process according to claim 5 wherein the weight ratio of elastomer:reinforcing element is from 1:0.3 to 1:0.01.

7. Reinforced elastomers comprising a conjointly vulcanized intimate mixture of reinforcing elements according to claim 1 and an elastomer which is natural rubber, polychloroprene, polyisoprene, styrene-butadiene rubber, or chlorinated polyethylene.

* * * * *